(12) United States Patent
Xiong et al.

(10) Patent No.: US 11,022,983 B2
(45) Date of Patent: Jun. 1, 2021

(54) GAIT CONTROL METHOD, DEVICE, AND TERMINAL DEVICE FOR BIPED ROBOT

(71) Applicant: UBTECH Robotics Corp, Shenzhen (CN)

(72) Inventors: Youjun Xiong, Shenzhen (CN); Ligang Ge, Shenzhen (CN); Chunyu Chen, Shenzhen (CN); Yizhang Liu, Shenzhen (CN); Zheng Xie, Shenzhen (CN); Zhaohui An, Shenzhen (CN); Jinghua Tang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 370 days.

(21) Appl. No.: 16/172,838

(22) Filed: Oct. 28, 2018

(65) Prior Publication Data
US 2019/0204848 A1    Jul. 4, 2019

(30) Foreign Application Priority Data
Dec. 29, 2017   (CN) .......................... 201711471845.9

(51) Int. Cl.
   *G05D 1/02*   (2020.01)
   *B25J 9/10*   (2006.01)
   (Continued)

(52) U.S. Cl.
   CPC ............ *G05D 1/0268* (2013.01); *B25J 9/106* (2013.01); *B25J 9/1615* (2013.01); *B25J 13/08* (2013.01); *B25J 17/00* (2013.01); *B62D 57/032* (2013.01); *G05D 1/0891* (2013.01); *G05D 2201/0217* (2013.01)

(58) Field of Classification Search
   CPC ....... G05D 1/02; B25J 9/10; B25J 9/16; B25J 13/08
   See application file for complete search history.

(56) References Cited

U.S. PATENT DOCUMENTS

| | | | | |
|---|---|---|---|---|
| 5,337,235 A | * | 8/1994 | Takahashi | B62D 57/032 180/8.1 |
| 5,808,433 A | * | 9/1998 | Tagami | B62D 57/032 180/8.6 |

(Continued)

OTHER PUBLICATIONS

Catherine A. Macleod et al "Reflex Control of Robotic Gait Using Human Walking Data"; 22 pages (Year: 2014).*

(Continued)

*Primary Examiner* — Kira Nguyen

(57) ABSTRACT

The present disclosure relates to robot technology, which provides a gait control method, device, and terminal device for a biped robot. The method includes: planning an initial position of an ankle joint of the biped robot and a rotation angle of a sole of the biped robot to rotate around one of a toe and a heel of the biped robot; planning a body pose of the biped robot; calculating a target position of the ankle joint based on the initial position of the ankle joint and the rotation angle of the sole; obtaining a joint angle of each of a plurality of joints of the biped robot by performing an operation on the body pose and the target position of the ankle joint utilizing an inverse kinematics algorithm; and adjusting a gait of the biped robot based on the joint angle of each of the joints.

18 Claims, 7 Drawing Sheets

(51) Int. Cl.
*B25J 9/16* (2006.01)
*B25J 17/00* (2006.01)
*B62D 57/032* (2006.01)
*G05D 1/08* (2006.01)
*B25J 13/08* (2006.01)

(56) References Cited

U.S. PATENT DOCUMENTS

| | | | | |
|---|---|---|---|---|
| 7,756,607 | B2 * | 7/2010 | Ikeuchi | B62D 57/032 |
| | | | | 700/245 |
| 8,805,584 | B2 * | 8/2014 | Yamane | B62D 57/032 |
| | | | | 700/254 |
| 10,351,189 | B2 * | 7/2019 | Blankespoor | B25J 9/1633 |
| 2007/0267994 | A1 * | 11/2007 | Sugihara | B62D 57/032 |
| | | | | 318/568.12 |
| 2010/0126785 | A1 * | 5/2010 | Shimada | B62D 57/032 |
| | | | | 180/8.1 |

OTHER PUBLICATIONS

Research on omnidirectional walking and path search on complex landform of gorilla robot, Deyu Yuan, China Master's Theses Full-text Database, Information Science and Thecnology 1140-578, Issue 2, 2015, pp. 8-27.
Single leg vertical hopping gait planning for hydraulic quadruped robot, Bingwei Gao et al., School of Mechanical Engineering, Issue 5, 2017, pp. 1087-1091.

* cited by examiner

GAIT CONTROL METHOD, DEVICE, AND TERMINAL DEVICE FOR BIPED ROBOT

CROSS REFERENCE TO RELATED APPLICATIONS

This application claims priority to Chinese Patent Application No. 201711471845.9, filed Dec. 29, 2017, which is hereby incorporated by reference herein as if set forth in its entirety.

BACKGROUND

1. Technical Field

The present disclosure relates to robot technology, and particularly to a gait control method, device, and terminal device for a biped robot.

2. Description of Related Art

A biped robot has two walking modes: static walking and dynamic walking. In the dynamic walking mode, since the projection point of the centroid of the biped robot can be outside the supporting polygon of the robot, it will be relatively complicated to control the biped robot to perform dynamic walking, which makes dynamic walking a hot research topic in robot technology.

At present, although many biped robots have successfully realized that going up and down the stairs by means of dynamic walking, in the gait control method of the existing biped robots, in order to reduce the difficulty in gait planning and control algorithms, it is usually necessary to introduce the premise that the plantar of the robot is always parallel to the ground. That is to say, whenever the robot raises and falls the legs, the plantar has to keep parallel to the ground at all times. Therefore, this gait is quite different from the gait of humans, and has a low simulation level. Moreover, in this gait, it is difficult for the robot to lift the leg to a large extent while the plantar is always parallel to the ground, the speed of the biped robot to go up and down the stairs is limited, and the monovalent efficiency of the biped robot is therefore reduced.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In order to explain the technical solutions described in the present disclosure, the following provides a description through specific embodiments.

Figure 1:
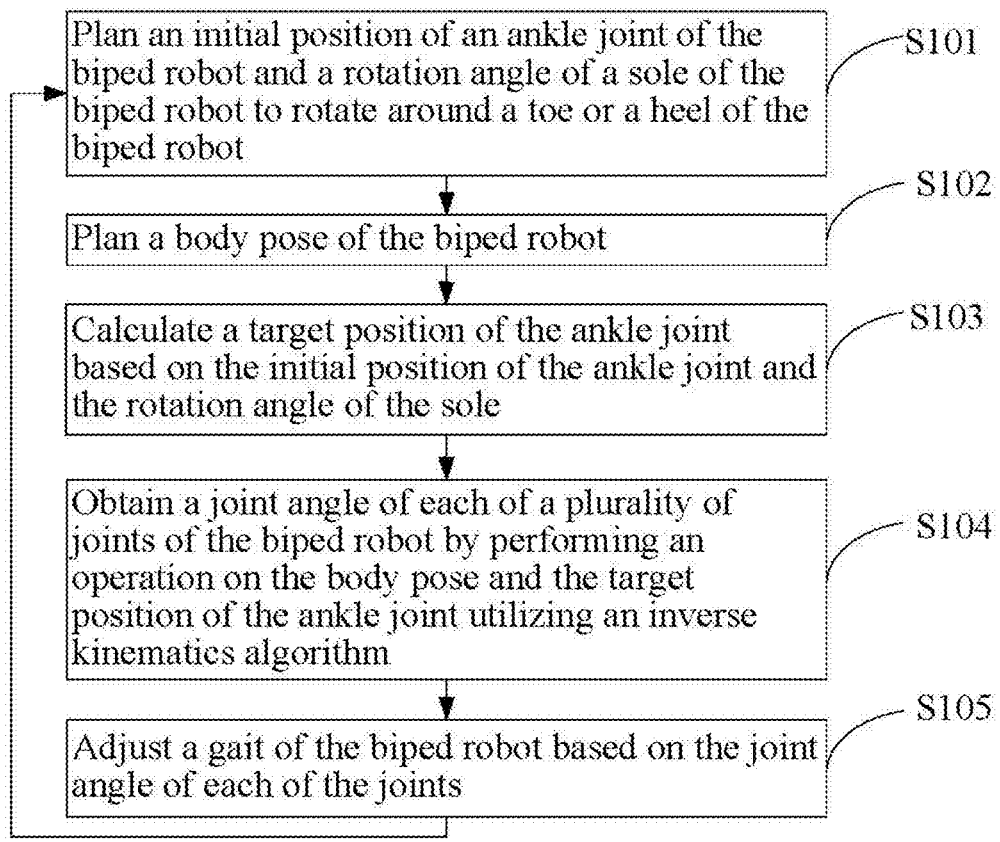
FIG. 1 is a flow chart of a biped robot gait control method according to an embodiment of the present disclosure.

FIG. 1 is a flow chart of a biped robot gait control method according to an embodiment of the present disclosure. In this embodiment, the method is a computer-implemented method executable for a processor. The biped robot gait control method of this embodiment can be applied to a servo of a robot, in the robot may be but not limited to a biped robot which can be equipped with sensors such as infrared sensors, ultrasound sensors, or laser sensors, and the servo may be used as a joint of the robot so as to realize the movement of a limb of the robot which connected to the joint, where the movement of the servo specifically means the movement of the output shaft of the servo. The robot includes a head, a body, a left arm, and a right arm, a left leg, and a right leg. As shown in FIG. 1, the method includes the following steps.

S101: planning an initial position of an ankle joint of the biped robot and a rotation angle of a sole of the biped robot to rotate around a toe or a heel of the biped robot.

S102: planning a body pose of the biped robot, where the body pose includes a body position and a body posture.

The initial position of the ankle joint and the rotation angle of the sole may be planned by, for example, manually or automatically defining and/or inputting the initial position and the rotation angle according to actual needs. In this embodiment, the robot specifically refers to a humanoid robot having two feet and being capable of walking. The robot can perform various motions or postures corresponding to a control command by receiving the control command of an external device or receiving the control command directly input by, the user.

The pose of the robot itself or a part of the robot (e.g., the both or the foot) refers to the position and the posture of the robot or the part in a space. In which, the position is a specific space coordinate, which can be represented by a position matrix; the posture refers to the final motion form that the robot or the part needs to present, which can be represented by a posture matrix composed of the cosine values of the included angles between each two of three axes in a coordinate system.

In this embodiment, a foot pose includes a foot position (e.g., the position of the ankle joint) and a foot posture (e.g., the rotation angle of the sole) which are respectively the position and the posture of each movable rod of the foot of the robot in a space. In which, the foot refers to as part of the robot which is composed of the ankle joint and the movable rod(s) below the ankle joint.

In this embodiment, in order to control the biped robot to go up and down the stairs by means of dynamic walking, various initialization parameters are planned through inputting by the user. The above-mentioned initialization parameters include, but are not limited to, the step height, the step width, and the angle between the foot of the robot and the horizontal ground. The initialization para asters are identified based on a preset algorithm to determine various control parameters of the biped robot at the current time. For example, the height of the leg of the biped robot at the current time, the length of the stride, the gait cycle, and the magnitude of the centroid shift are determined. Based on the determined control parameters, a centroid motion trajectory of the robot and a foot motion trajectory are obtained. In which, the foot motion trajectory includes the above-mentioned foot position and the foot posture.

The body pose of the biped robot may be planned by, for example, manually or automatically defining and/or inputting the body pose according to actual needs. The body pose of the robot is the pose of the trunk of the robot, which is used to indicate the position and posture of the centroid of the trunk at various times. The body pose of the robot is also obtained based on the above-mentioned various control parameters of the biped robot.

S103 calculating a target position of the ankle joint based on the initial position of the ankle joint and the rotation angle of the sole.

S104: obtaining a joint angle of each of a plurality of joints of the biped robot by performing an operation on the body pose and the target position of the ankle joint utilizing an inverse kinematics algorithm.

The inverse kinematics is used to calculate all joint variables of the corresponding position of the robot based on the position and posture of a known end of the robot.

In this embodiment, the preset inverse kinematics algorithm is used to calculate the body pose and the foot posture including the target position of the ankle joint of the robot, so as to obtain the joint angle of each of the joints of the left and right legs of the robot. The above-mentioned inverse kinematics algorithm includes, but is not limited to, an analytical method and a numerical method. The joints of the robot include but are not limited to ankle joints, knee joints, and hip joints. Each joint is equipped with one servo for controlling the joint to rotate. In which, in the angle obtained through the above-mentioned inverse kinematics algorithm, the joint angle of each joint includes a roll angle, a pitch angle, and a swine angle of the joint.

Figure 2:
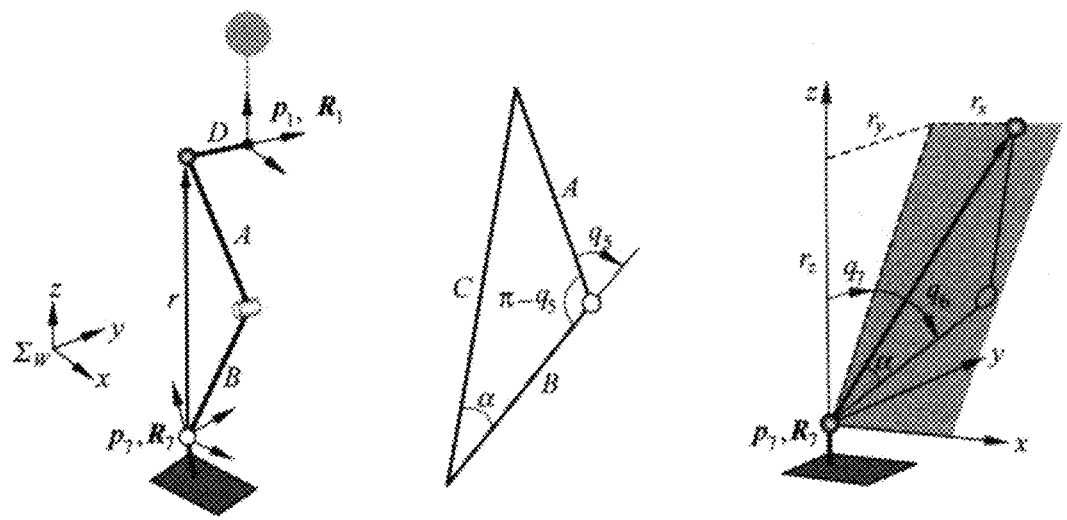
FIG. 2 is a schematic block diagram of a leg model of a biped robot according to an embodiment of the present disclosure.

FIG. 2 is a schematic block diagram of a leg model of a biped robot according to an embodiment of the present disclosure. As shown in FIG. 2, if the body pose and the sole pose of the biped robot are $(p_1, R_1)$ and $(p_7, R_7)$, respectively (a pose includes a position p and a rotation angle R), the distance from the origin of the coordinate system of the trunk to the hip joint is D, the length of the thigh is A, and the length of the calf is B, the position of the hip joint can be calculated by the following formula:

$$p_2 = p_1 + R_1 \begin{bmatrix} 0 \\ D \\ 0 \end{bmatrix}; \qquad (1)$$

in the coordinate system of the ankle joint, the position vector of the hip joint is:

$$r = R_7^T(p_2 - p_7) = [r_x \ r_y \ r_z]^T \qquad (2)$$

then, the relative distance C between the ankle joint and the hip joint is:

$$C = \sqrt{r_x^2 + r_y^2 + r_z^2} \qquad (3)$$

according to the cosine theorem, in the biped robot, the angle $q_5$ of the knee joint is:

$$q_5 = -\arccos\left(\frac{A^2 + B^2 - C^2}{2AB}\right) + \pi; \qquad (4)$$

in the coordinate system of the ankle joint, based on the vector r, the roll angle $q_7$ and the pitch angle $q_6$ of the ankle joint are respectively:

$$q_7 = \mathrm{atan}\ 2(r_y, r_z); \text{ and} \qquad (5)$$

$$q_6 = -\mathrm{atan}\ 2(r_x, \mathrm{sign}(r_z)\sqrt{r_y^2 + r_z^2}) - \alpha; \qquad (6)$$

for the swing angle $q_2$, the roll angle $q_3$, and the pitch angle $q_4$ of the hip joint, the relationship between the postures of each connection rod of the hip joint is:

$$R_7 = R_1 R_z(q_2) R_x(q_3) R_y(q_4) R_y(q_5 + q_6) R_x(q_7); \qquad (7)$$

therefore, based on the above-mentioned formula (7):

$$q_2 = \mathrm{atan}\ 2(-R_{12}, R_{22}); \qquad (8)$$

$$q_2 = \mathrm{atan}\ 2(-R_{32}, -R_{12} \sin q_2 = R_{22} \cos q_2); \text{ and} \qquad (9)$$

$$q_4 \mathrm{atan}\ 2(-R_{31}, R_{33}) \qquad (10)$$

Figure 5:
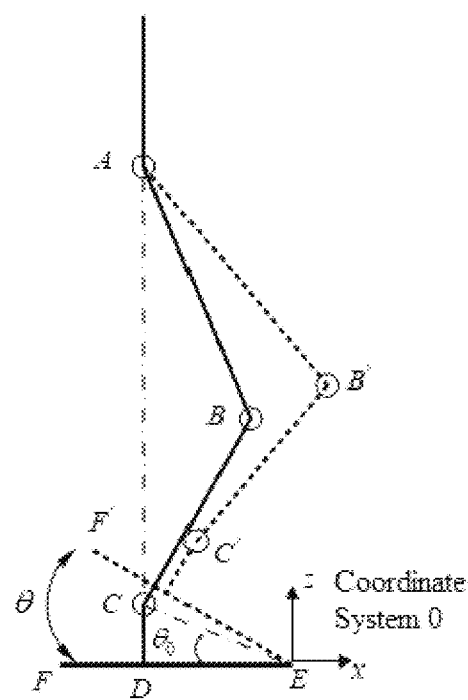
FIG. 5 is a schematic block diagram of a model of a biped robot according to an embodiment of the present disclosure.

In this embodiment, a change amount of the position of the ankle joint of the biped robot in calculated based on the size of the sole (a pre-designed parameter of the biped robot) and the planned rotation angle of the sole, and then the target position of the ankle joint is obtained by adding the planned initial position of the ankle joint and the change amount of the position of the ankle joint (see FIG. 5).

S105: adjusting a gait of the biped robot based on the joint angle of each of the joints.

Based on the joint angle of each joint in the biped robot obtained by the above-mentioned calculation, each joint of the biped robot is controlled to rotate, so that the joint reaches its corresponding swing angle, roll angle and pitch angle in each direction. Therefore, through the joint action of the joints, the adjustment of the gait of the biped robot during walking is realized, so that it can have a preset body posture and foot posture at each moment.

Furthermore, after adjusting the gait of the biped robot based on the calculated joint angles, it returns to the above-mentioned S101 to recalculate the joint angle of each joint of the biped robot at this moment based on the corresponding foot pose (including the initial position of the ankle joint and the rotation angle of the sole) and body pose of the biped robot at the latest moment.

In this embodiment, planning and control to the foot pose of the robot is added in the process of adjusting the walking gait of the biped robot, which calculates the joint angle of each joint of the robot by integrating the body pose and the foot pose of the robot, so that the biped robot can realize walking the manner of humanoid gait after adjusting the gait of the robot based on the joint angle of each joint. Consequently, the simulation level of the robot is enhanced, so that the walking gait of the robot is smoother, the speed of the biped robot to go up and down the stairs is therefore increased, and the movement ability and movement efficiency of the robot are enhanced.

Figure 3:
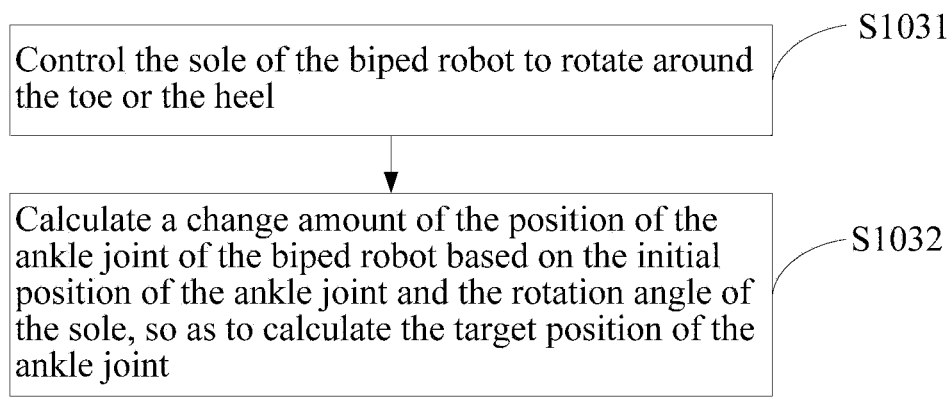
FIG. 3 is a flow chart of an embodiment of step S103 of the biped robot gait control method according to the present disclosure.

FIG. 3 is a flow chart of an embodiment of step S103 of the biped robot gait control method according to the present disclosure. As shown in FIG. 3, the method includes the following steps.

S103: controlling the sole of the biped robot to rotate around the toe or the heel.

During the process of the robot to swing the legs, the sole of the robot is controlled to rotate around the toe or the heel at the moment of lifting and falling the legs, so that the plantar of the foot of the robot and the ground are no longer keeping horizontal, and a certain included angle is kept between the plantar and the ground.

Figure 4:
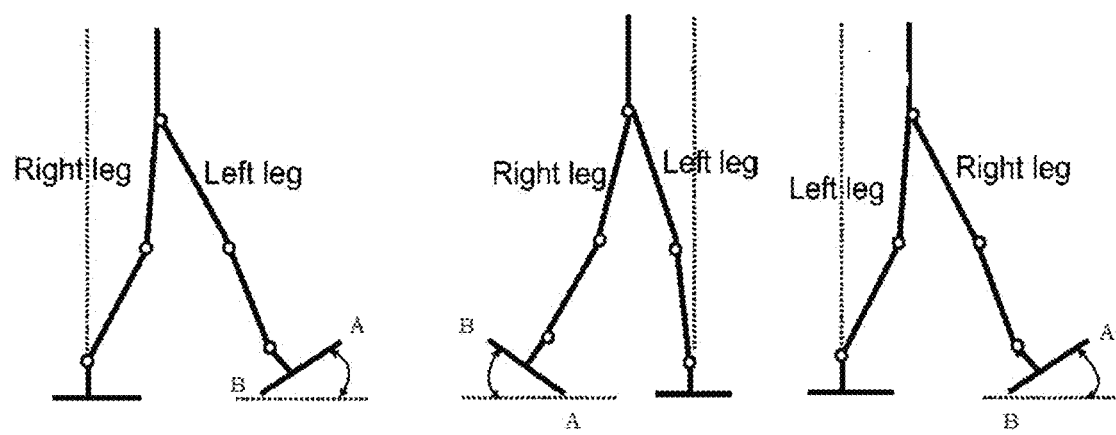
FIG. 4 is a schematic block diagram of a walking gait of a biped robot on a flat land according to an embodiment of the present disclosure.

FIG. 4 is a schematic block diagram of a walking gait of a biped robot on a flat land according to an embodiment of the present disclosure. As shown in FIG. 4, specifically, for one foot of the biped robot, when the change amount of the angle of the ankle joint in accordance with the planning is a positive value (the change amount is obtained by the calculation in step S1032), a contact point A of the toe of the biped robot and a supporting surface is taken as an end point to control the sole of the biped robot to rotate around the contact point A; when the change amount of the angle of the ankle joint in accordance with the planning is a negative value, a contact point B of the heel of the biped robot and the supporting surface is taken as an end point to control the sole of the biped robot to rotate around the contact point B. Through the method provided by this embodiment, the biped robot is able to walk in a humanoid gait manner that advance with the toes first and then grounding with the heck.

S1032: calculating a change amount of the position of the ankle joint of the biped robot based on the initial position of the ankle joint and the rotation angle of the sole, so as to calculate the target position of the ankle joint.

In the process of the robot going up and down the stairs, the coordinates of the ankle joint of the robot at different moments are different. In this embodiment, at each moment, the target position of the and joint that is about to reach at the next moment is calculated.

FIG. 5 is a schematic block diagram of a model of a biped robot according to an embodiment of the present disclosure. As shown in FIG. 5, the solid line is the position of the leg for supporting before the rotation of the sole of the biped robot, and the broken line is the position where the leg for supporting is located after the sole of the biped robot is rotated for an angle θ. It is defined that the forward direction of the robot is the X-axis of the coordinate system, the vertical direction is the Z-axis of the coordinate system, the Y-axis of the coordinate system is determined by the right-handed system, and the origin of the coordinate system is located at the E point of the toe of the biped robot. In which, the point A represents the hip joint of the biped robot, the points B and C represent the initial position of the ankle joint and the knee joint of the biped robot and EF is the length of one foot of the biped robot. The B and C respectively represent the target positions of the knee joint and the ankle joint after the sole is rotated for the angle θ.

When the foot posture of the leg for supporting of the biped robot changes, the position of the coordinate of the ankle joint of the robot will change to indirectly affect the position and posture of the body of the robot. Therefore, in this embodiment, the change amount of the position of the ankle joint is calculated based on the rotation angle of the sole and the initial position of the ankle joint.

Specifically, in the sole EF of the biped robot in FIG. 5, the coordinate system is established with the toe E as the origin. Before the sole EF of the robot is controlled to rotate around the toe E, the initial position C of the ankle joint in the coordinate system is:

$$\begin{bmatrix} C_x \\ C_z \end{bmatrix} = \begin{bmatrix} -DE \\ CD \end{bmatrix} \quad (11)$$

After controlling the sole FE of the robot to rotate around the toe F for the angle θ, the ankle joint is rotated from the initial position C of the to the target position C. It can be known by the geometric relationship that, the position of the target position C in the coordinate system is:

$$\begin{bmatrix} C'_x \\ C'_z \end{bmatrix} = \begin{bmatrix} -CE * \cos(\theta + \theta_0) \\ CE * \sin(\theta + \theta_0) \end{bmatrix} \quad (12)$$

where $\theta_o$ is an initial included angle between the plane where the instep CE of the biped robot locates and the horizontal ground.

Based on the above formulas (11) and (12), it can be found that after the foot EF of the biped robot rotates the angle θ around the toe E, the change amount of the position of the ankle joint is:

$$\begin{bmatrix} \delta_{ankle\_x} \\ \delta_{ankle\_z} \end{bmatrix} = \begin{bmatrix} C'_x \\ C'_z \end{bmatrix} - \begin{bmatrix} C_x \\ C_z \end{bmatrix} = \begin{bmatrix} -CE * \cos(\theta + \theta_0) + DE \\ CE * \sin(\theta + \theta_0) - CD \end{bmatrix} \quad (13)$$

The target position of the ankle joint is calculated based on the positional change of the ankle joint by adding the positional change of the ankle joint and the initial position of the ankle joint. Based on the body pose and the target position of the ankle joint corresponding to the biped robot at the current time, the joint angle of each joint of the biped robot is calculated by inverse kinematics.

In this embodiment, by controlling the sole of the robot to rotate, the thigh of the robot can be swung in advance based on the change of the position of the ankle joint before the body of the robot moves, thereby reducing the influence of the thigh on the posture of the body of the robot during the swing of the body. In this embodiment, since the sole of the robot is no longer kept parallel with the ground at every moment, and walks in a manner that advance with the toes first and then grounding with the heels. As a result, the biped robot realizes a manner of going up and down the stairs in a humanoid gait.

It should be understood that, the sequence of the serial number of the steps in the above-mentioned embodiments does not mean the execution order while the execution order of each process should be deter pined by its function and internal logic, which should not be taken as any limitation to the implementation process of the embodiments.

Figure 6:
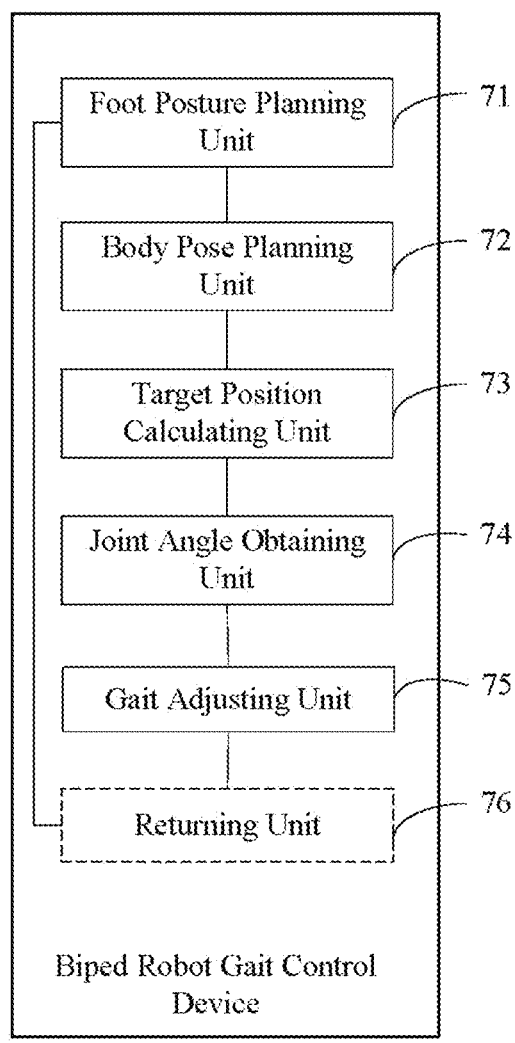
FIG. 6 is a schematic diagram of a biped robot gait control device according to an embodiment of the present disclosure.

FIG. 6 is a schematic diagram of a biped robot gait control device according to an embodiment of the present disclosure. The biped robot, gait control device corresponds to the biped robot gait control method described in the above-mentioned embodiment. For the convenience of description, only parts related to this embodiment are shown.

As shown in FIG. 6, the device is:

a foot posture planning unit 71 configured to plan an initial position of an ankle joint cat the biped robot and a rotation angle of a sole of the biped robot to rotate around a toe or a heel of the biped robot;

a body pose planning unit 72 configured to plan a body pose of the biped robot, where the body pose includes a body position and a body posture;

a target position calculating unit 73 configured to calculate a target position of the ankle joint based on the initial position of the ankle joint and the rotation angle of the sole;

a joint angle obtaining unit 74 configured to obtain a joint angle of each of a plurality of joints of the biped robot by performing an operation on the body pose and the target position of the ankle joint utilizing an inverse kinematics algorithm; and a gait adjusting unit 75 configured to adjust a gait of the biped robot based on the joint angle of each of the joints.

Optionally, the gait adjusting unit 75 includes:

a rotation subunit configured to control the sole of the biped robot to rotate around the toe or the heel; and a first calculating subunit configured to calculate the target position of the ankle joint by calculating a change amount of the position of the ankle joint of the biped robot based on the initial position of the ankle joint and the rotation angle of the sole.

Optionally, the rotation subunit is specifically configured to:

take a contact point of the toe of the biped robot and a supporting surface as a first end point to control the sole of the biped robot to rotate around the first end point; and take a contact point of the heel of the biped robot and the supporting surface as a second end point to control the sole of the biped robot to rotate around the second end point.

Optionally, the biped robot gait control device further includes:

A returning unit 76 configured to return to the step (S101) of planning the initial position of the ankle joint of the biped robot and the rotation angle of the sole of the biped robot to rotate around the toe or the heel of the biped robot.

In this embodiment, planning and control to the foot pose of the robot is added in the process of adjusting the walking gait of the biped robot, which calculates the joint angle of each joint of the robot by integrating the buds pose and the foot pose of the robot, so that the biped robot can realize walking in the manner of humanoid gait after adjusting the gait of the robot based on the joint angle of each joint. Consequently, the simulation level of the robot is enhanced, so that the walking gait of the robot is smoother, the speed of the biped robot to go up and down the stairs is therefore increased, and the movement ability and movement efficiency of the robot are enhanced.

Figure 7:
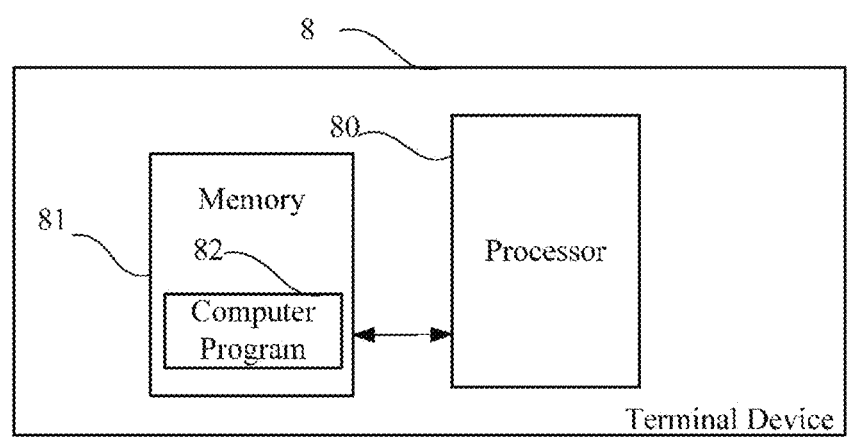
FIG. 7 is a schematic diagram of a terminal device according to an embodiment of the present disclosure.

FIG. 7 is a schematic diagram of a terminal device according to an embodiment of the present disclosure. The terminal device of this embodiment can be used to control a servo of a robot. As shown in FIG. 7, the terminal device 8 of this embodiment includes a processor 80, a memory 81, and a computer program 82 stored in the memory 81 and executable on the processor 80, for example, a biped robot gait control program. When executing (instructions in) the computer program 82, the processor 80 implements the steps in the above-mentioned embodiments of the biped robot gait control method, for example, steps S101-S104 shown in FIG. 1. Alternatively, when the processor 80 executes (instructions in) the computer program 82, the functions of each module/unit in the above-mentioned device embodiments, for example, the functions of the modules 71-75 shown in FIG. 5 are implemented.

Exemplary, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the terminal device 8.

The terminal device 8 may be a computing device such as a desktop computer, a notebook computer, a tablet computer, and a cloud server. The terminal device 8 may include, but is not limited to, a processor 80 and a storage 81. It can be understood by those skilled in the art that FIG. 7 is merely an example of the terminal device 8 and does not constitute a limitation on the terminal device 8, and may include more or fewer components than those shown in the figure, or a combination of some components or different components. For example, the terminal device 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the terminal device 8, for example, a hard disk or a memory of the terminal device 8. The storage 81 may also be an external storage device of the terminal device 8, for example, a plug-in hard disk, a smart media card (SMC), a secure digital (SD) card, flash card, and the like, which is equipped on the terminal device 8. Furthermore, the storage 81 may further include both an internal storage unit and an external storage device, of the terminal device 8. The storage 81 is configured to store the computer program and other programs and data required by the terminal device 8. The storage 81 may also be used to temporarily store data that has been or will be output.

Those, skilled in the art may clearly understand that, for the convenience and simplicity of description, the division of the above-mentioned motional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplification units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and, may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented gait control method for a biped robot, comprising executing on a processor steps of:
    planning an initial position of an ankle joint of the biped robot and a rotation angle of a sole of the biped robot to rotate around one of a toe and a heel of the biped robot;
    planning a body pose of the biped robot, wherein the body pose comprises a body position and a body posture;
    calculating a target position of the ankle joint based on the initial position of the ankle joint and the rotation angle of the sole;
    obtaining a joint angle of each of a plurality of joints of the biped robot by performing an operation on the body pose and the target position of the ankle joint utilizing an inverse kinematics algorithm; and
    adjusting a gait of the biped robot based on the joint angle of each of the joints, through a joint action of the joints;
    wherein before the step of planning the initial position comprises:
    obtaining control parameters of the biped robot at current time, wherein the control parameters comprise a height of a leg of the biped robot, a length of stride of the biped robot, a gait cycle of the biped robot, and a magnitude of centroid shift of the biped robot; and
    obtaining a centroid motion trajectory and a foot motion trajectory of the biped robot based on the control parameters; and
    wherein the step of planning the initial position comprises:
    planning the initial position of the ankle joint of the biped robot and the rotation angle of the sole of the biped robot to rotate around one of the toe and the heel of the biped robot based on the foot motion trajectory;
    the step of planning the body pose of the biped robot, comprises:
    planning the body pose of the biped robot based on the centroid motion trajectory.

2. The method of claim 1, wherein the step of calculating the target position of the ankle joint based on the initial position of the ankle joint and the rotation angle of the sole comprises:
    controlling the sole of the biped robot to rotate around the toe or the heel; and
    calculating the target position of the ankle joint based on calculating a change amount of the position of the ankle joint of the biped robot on the basis of the initial position of the ankle joint and the rotation angle of the sole.

3. The method of claim 2, wherein the step of controlling the sole of the biped robot to rotate around the toe or the heel comprises one of:
   taking a contact point of the toe of the biped robot and a supporting surface as a first end point to control the sole of the biped robot to rotate around the first end point; and
   taking a contact point of the heel of the biped robot and a supporting surface as a second end point to control the sole of the biped robot to rotate around the second end point.

4. The method of claim 2, wherein the step of controlling the sole of the biped robot to rotate around the toe or the heel comprises:
   determining whether a change amount of an angle of the ankle joint in accordance with a planning is a positive value or a negative value;
   taking a contact point of the toe of the biped robot and a supporting surface as a first end point to control the sole of the biped robot to rotate around the first end point, in response to the change amount of the angle of the ankle joint in accordance with the planning being the positive value; and
   taking a contact point of the heel of the biped robot and a supporting surface as a second end point to control the sole of the biped robot to rotate around the second end point, in response to the change amount of the angle of the ankle joint in accordance with the planning being the negative value.

5. The method of claim 1, wherein the step of obtaining the control parameters of the biped robot at the current time comprises:
   planning initialization parameters of the biped robot, wherein the initialization parameters comprise: a step height, a step width, and an angle between a foot of the biped robot and a horizontal ground;
   determining the control parameters of the biped robot at the current time by identifying the initialization parameters based on a preset algorithm.

6. The method of claim 1, wherein coordinates of the ankle joint of the biped robot at different moments are different, and the target position of the ankle joint that is about to reach at next moment is calculated at each moment.

7. A gait control device for a biped robot, comprising:
   a foot posture planning unit configured to plan an initial position of an ankle joint of the biped robot and a rotation angle of a sole of the biped robot to rotate around one of a toe and a heel of the biped robot;
   a body pose planning unit configured to plan a body pose of the biped robot, wherein the body pose comprises a body position and a body posture;
   a target position calculating unit configured to calculate a target position of the ankle joint based on the initial position of the ankle joint and the rotation angle of the sole;
   a joint angle obtaining unit configured to obtain a joint angle of each of a plurality of joints of the biped robot by performing an operation on the body pose and the target position of the ankle joint utilizing an inverse kinematics algorithm;
   a gait adjusting unit configured to adjust a gait of the biped robot based on the joint angle of each of the joints, through a joint action of the joints;
   a control parameters obtaining unit configured to obtain control parameters of the biped robot at current time, wherein the control parameters comprise a height of a leg of the biped robot, a length of stride of the biped robot, a gait cycle of the biped robot, and a magnitude of centroid shift of the biped robot; and
   a motion trajectory obtaining unit configured to obtain a centroid motion trajectory and a foot motion trajectory of the biped robot based on the control parameters;
   wherein the foot posture planning unit is further configured to plan the initial position of the ankle joint of the biped robot and the rotation angle of the sole of the biped robot to rotate around one of the toe and the heel of the biped robot based on the foot motion trajectory; and
   the body pose planning unit is further configured to plan the body pose of the biped robot based on the centroid motion trajectory.

8. The device of claim 7, wherein the target position calculating unit comprises:
   a rotation subunit configured to control the sole of the biped robot to rotate around the toe or the heel; and
   a first calculating subunit configured to calculate the target position of the ankle joint based on calculating a change amount of the position of the ankle joint of the biped robot on the basis of the initial position of the ankle joint and the rotation angle of the sole.

9. The device of claim 8, wherein the rotation subunit is configured to:
   take a contact point of the toe of the biped robot and a supporting surface as a first end point to control the sole of the biped robot to rotate around the first end point; or
   take a contact point of the heel of the biped robot and a supporting surface as a second end point to control the sole of the biped robot to rotate around the second end point.

10. The device of claim 8, wherein the rotation subunit is configured to:
   determine whether a change amount of an angle of the ankle joint in accordance with a planning is a positive value or a negative value;
   take a contact point of the toe of the biped robot and a supporting surface as a first end point to control the sole of the biped robot to rotate around the first end point, in response to the change amount of the angle of the ankle joint in accordance with the planning being the positive value; and
   take a contact point of the heel of the biped robot and a supporting surface as a second end point to control the sole of the biped robot to rotate around the second end point, in response to the change amount of the angle of the ankle joint in accordance with the planning being the negative value.

11. The device of claim 7, wherein the control parameters obtaining unit is further configured to:
   plan initialization parameters of the biped robot, wherein the initialization parameters comprise: a step height, a step width, and an angle between a foot of the biped robot and a horizontal ground; and
   determine the control parameters of the biped robot at the current time by identifying the initialization parameters based on a preset algorithm.

12. The device of claim 7, wherein coordinates of the ankle joint of the biped robot at different moments are different, and the target position calculating unit is further configured to calculate the target position of the ankle joint that is about to reach at next moment at each moment.

13. A terminal device for a biped robot, comprising a memory, one or more processors, and one or more computer program, wherein the one or more computer programs are stored in the memory and configured to be executed by the one or more processors, the one or more programs comprise:

instructions for planning an initial position of an ankle joint of the biped robot and a rotation angle of a sole of the biped robot to rotate around one of a toe and a heel of the biped robot;

instructions for planning a body pose of the biped robot, wherein the body pose comprises a body position and a body posture;

instructions for calculating a target position of the ankle joint based on the initial position of the ankle joint and the rotation angle of the sole;

instructions for obtaining a joint angle of each of a plurality of joints of the biped robot by performing an operation on the body pose and the target position of the ankle joint utilizing an inverse kinematics algorithm;

instructions for adjusting a gait of the biped robot based on the joint angle of each of the joints, through a joint action of the joints;

instructions for obtaining control parameters of the biped robot at current time, wherein the control parameters comprise a height of a leg of the biped robot, a length of stride of the biped robot, a gait cycle of the biped robot, and a magnitude of centroid shift of the biped robot; and instructions for obtaining a centroid motion trajectory and a foot motion trajectory of the biped robot based on the control parameters;

wherein the instructions for planning the initial position of the ankle joint of the biped robot and the rotation angle of the sole of the biped robot to rotate around one of the toe and the heel of the biped robot, comprise;

instructions for planning the initial position of the ankle joint of the biped robot and the rotation angle of the sole of the biped robot to rotate around one of the toe and the heel of the biped robot based on the foot motion trajectory; and the instructions for planning the body pose of the biped robot, comprise:

instructions for planning the body pose of the biped robot based on the centroid motion trajectory.

14. The terminal device of claim 13, wherein the instructions for calculating the target position of the ankle joint based on the initial position of the ankle joint and the rotation angle of the sole comprise:

instructions for controlling the sole of the biped robot to rotate around the toe or the heel; and instructions for calculating the target position of the ankle joint based on calculating a change amount of the position of the ankle joint of the biped robot on the basis of the initial position of the ankle joint and the rotation angle of the sole.

15. The terminal device of claim 14, wherein the instructions for controlling the sole of the biped robot to rotate around the toe or the heel comprises comprise one of:

instructions for taking a contact point of the toe of the biped robot and a supporting surface as a first end point to control the sole of the biped robot to rotate around the first end point; and instructions for taking a contact point of the heel of the biped robot and a supporting surface as a second end point to control the sole of the biped robot to rotate around the second end point.

16. The terminal device of claim 14, wherein the instructions for controlling the sole of the biped robot to rotate around the toe or the heel comprise:

instructions for determining whether a change amount of an angle of the ankle joint in accordance with a planning is a positive value or a negative value;

instructions for taking a contact point of the toe of the biped robot and a supporting surface as a first end point to control the sole of the biped robot to rotate around the first end point, in response to the change amount of the angle of the ankle joint in accordance with the planning being the positive value; and instructions for taking a contact point of the heel of the biped robot and a supporting surface as a second end point to control the sole of the biped robot to rotate around the second end point, in response to the change amount of the angle of the ankle joint in accordance with the planning being the negative value.

17. The terminal device of claim 13, wherein the instructions for obtaining the control parameters of the biped robot at the current time comprise:

instructions for planning initialization parameters of the biped robot, wherein the initialization parameters comprise: a step height, a step width, and an angle between a foot of the biped robot and a horizontal ground; and instructions for determining the control parameters of the biped robot at the current time by identifying the initialization parameters based on a preset algorithm.

18. The terminal device of claim 13, wherein coordinates of the ankle joint of the biped robot at different moments are different, and the target position of the ankle joint that is about to reach at next moment is calculated at each moment.

* * * * *